Dec. 9, 1941.  H. J. SPANNER  2,265,323
GAS AND METAL VAPOR DISCHARGE TUBE AND MEANS FOR
PREVENTING FLICKER THEREIN
Filed March 10, 1934   3 Sheets-Sheet 2
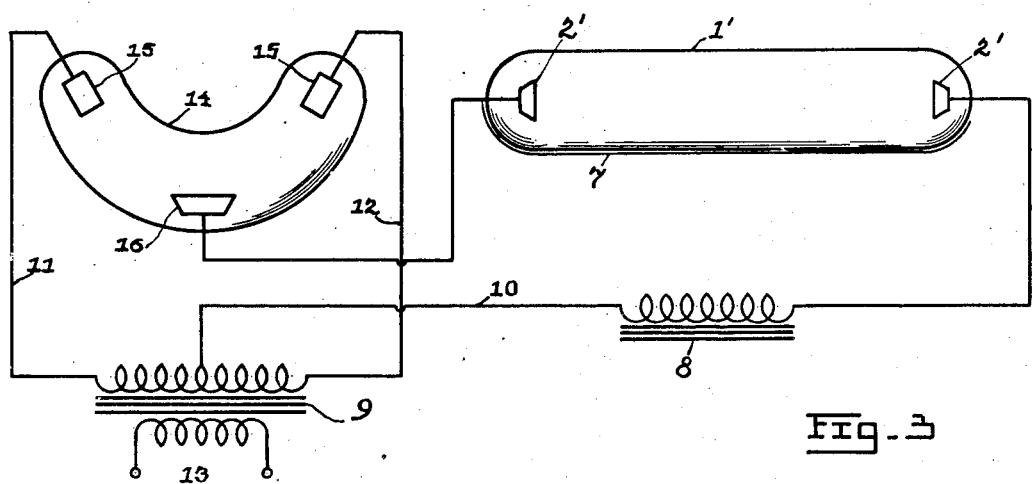
Fig-3
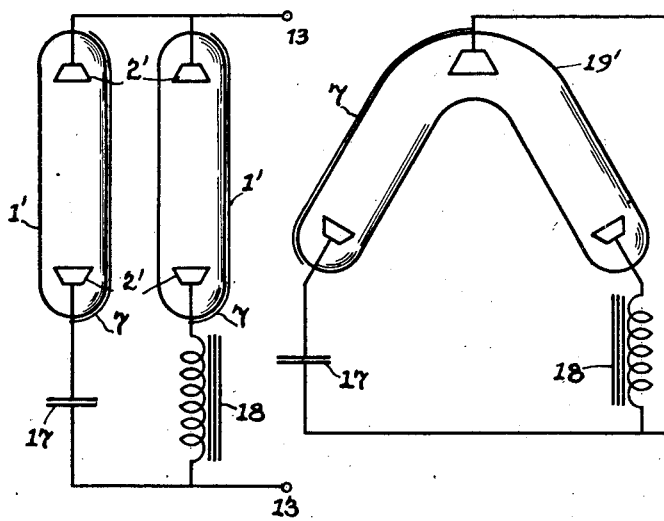
Fig-4-a   Fig-4-b
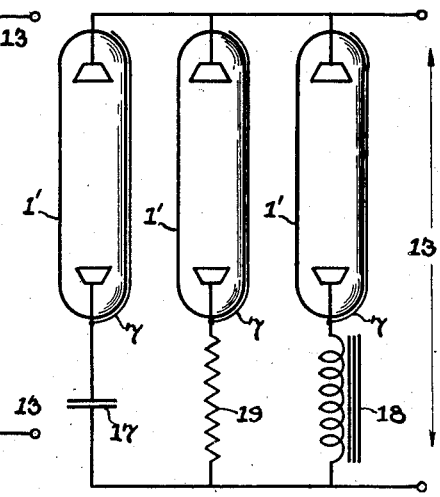
Fig-4-c
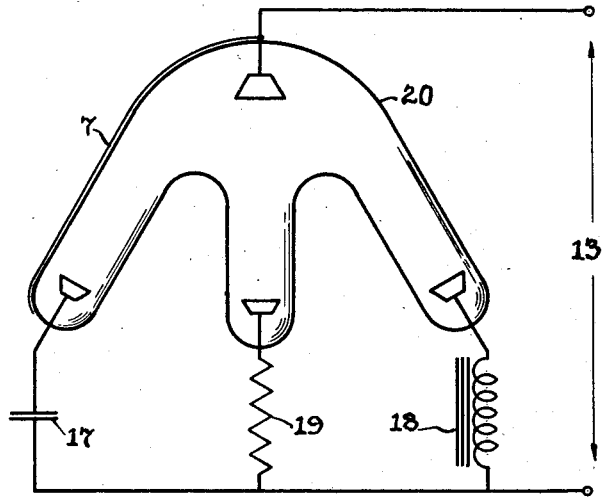
Fig-4-d
INVENTOR
Hans Joachim Spanner

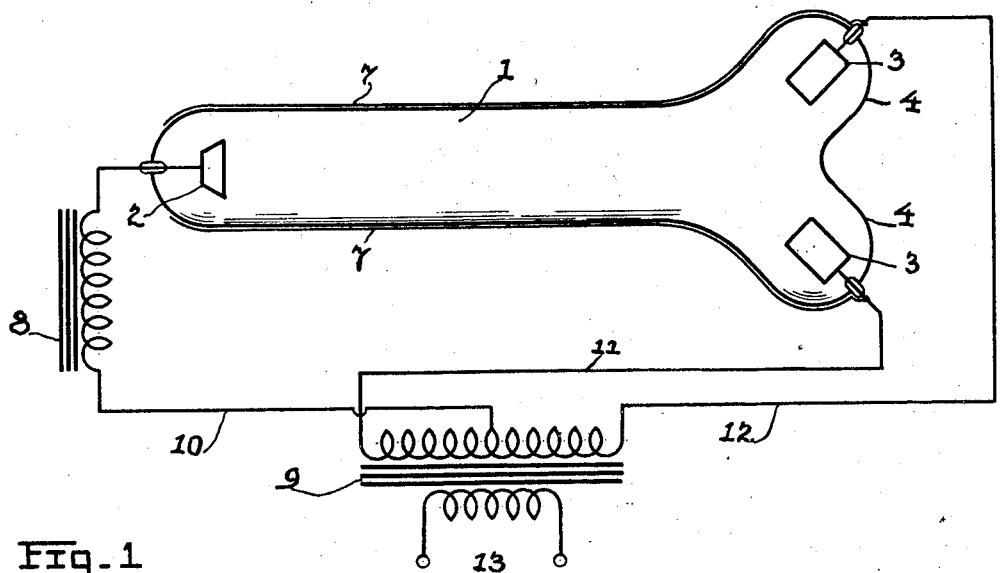
Fig.1
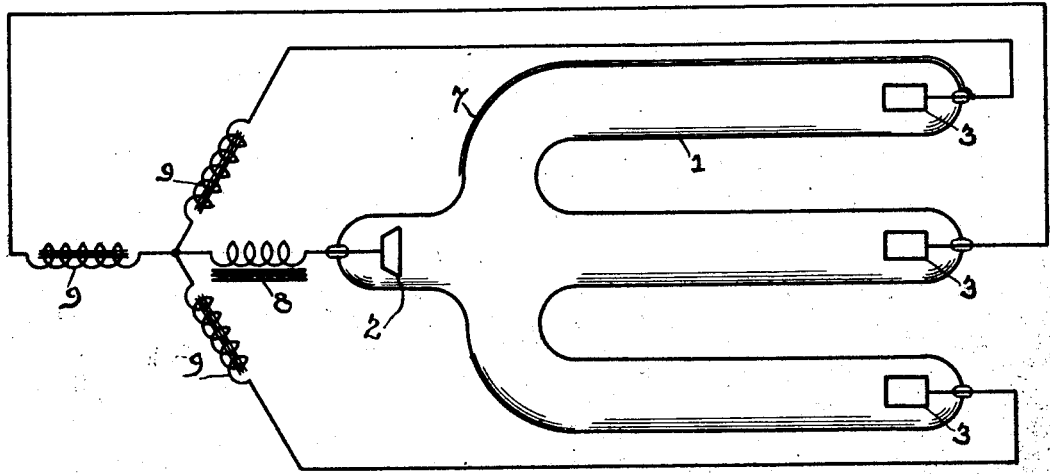
Fig.1-a
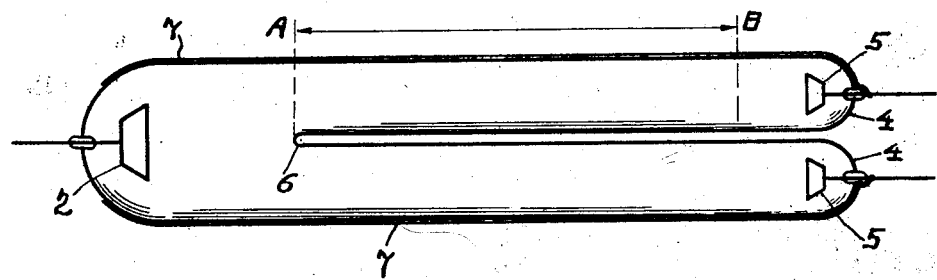
Fig.2

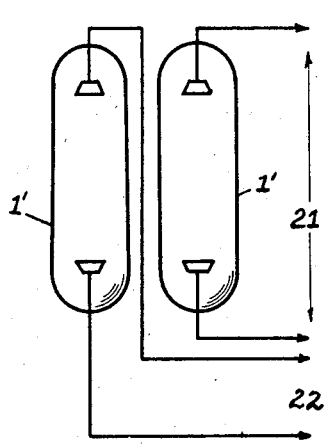
Fig-5-a
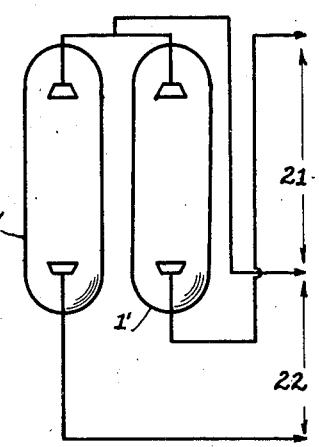
Fig-5-b
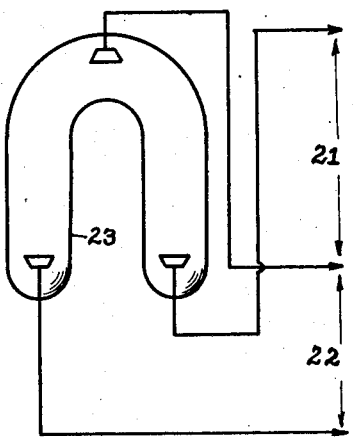
Fig-5-c
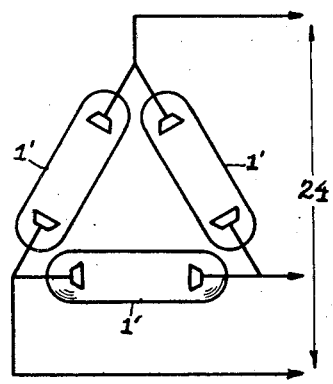
Fig-6-a
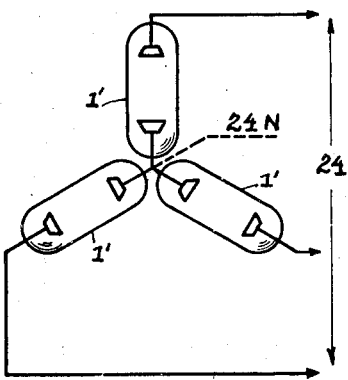
Fig-6-b
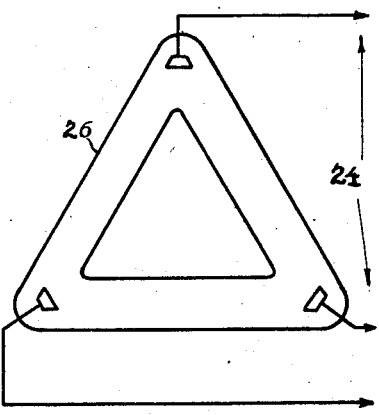
Fig-6-c
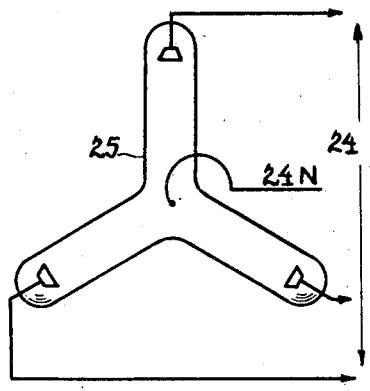
Fig-6-d
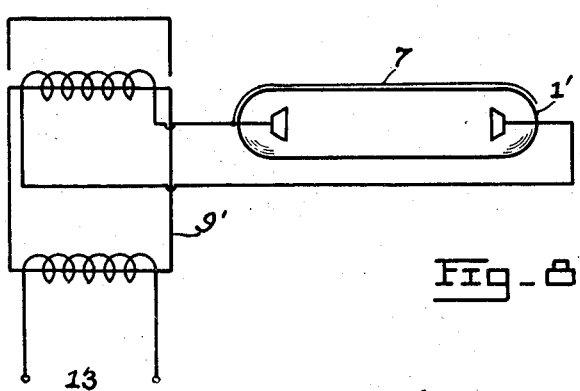
Fig-8
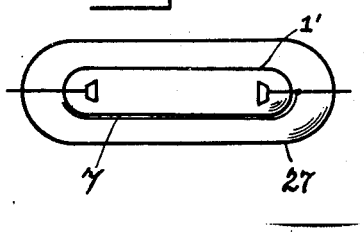
Fig-7

Patented Dec. 9, 1941

2,265,323

UNITED STATES PATENT OFFICE 2,265,323

GAS AND METAL VAPOR DISCHARGE TUBE AND MEANS FOR PREVENTING FLICKER THEREIN

Hans Joachim Spanner, Berlin, Germany, assignor to General Electric Company, a corporation of New York Application March 10, 1934, Serial No. 714,949
In Germany July 13, 1932

2 Claims. (Cl. 176—124)

This invention relates to gas and metal vapor discharge devices designed for use as sources of visible and ultra-violet radiation, especially for illuminating purposes, therapeutic radiation, dual purpose lighting, etc., and means for preventing the radiated output of said devices from flickering or appearing to flicker when they are operated from an alternating current supply.

The object of this invention is to prevent the radiated output of such devices from flickering and thus greatly broaden their field of usefulness which is at the present time limited due to this undesirable feature of theirs. The flicker in this type of lamp is their one characteristic which has prevented their wide use as a source of general illumination. This flicker gives rise to a phenomenon similar to the well known "stroboscopic effect" and causes moving objects illuminated by these lamps to appear to have a jerky motion or to stand still completely. This makes them not only undesirable for general illumination purposes but, under some conditions, even dangerous.

It is the nature of alternating current that twice every cycle the current is reduced to zero. Thus there is no energy input to the lamp at these times. If there is no energy storage of any form in the lamp then the light emission will cease until more energy is supplied. In the incandescent lamp the storage is in the form of heat storage in the filament, and this is sufficient to maintain the light output for the periods when the current is zero, and thus no flicker is noticeable in such heated filament lamps except in the cases when the frequency of the source of power is low, as with a frequency of 25 cycles. As the amount of flicker depends on the energy storage in the filament; the thicker, heavier filament that is used, the less flicker will be noticed; so that by proper design the problem of flicker causes very little trouble in incandescent filament lamps. However in gas and metal vapor discharge tubes where the source of the radiated energy is an excited and luminescent gas or vapor which has an exceedingly small capacity for storage of energy, the problem of elimination of the flicker is very important.

Previous to my invention reduction of the flicker was accomplished in such lamps as the Cooper-Hewitt lamps by the use of the self-rectifying principle. This gave a light source for operation on alternating current with greatly diminished but still noticeable flicker. It is one of the objects of this invention to use this principle of rectification for flicker elimination, but in connection with a greatly improved type of tube.

The lamps used may be of the type described in the prior applications: Germer, Serial No. 500,346, filed December 5, 1930; Spanner, Serial No. 558,148, filed August 19, 1931; and Spanner et al., Serial No. 643,502, filed November 19, 1932.

They are characterized by the use of a special type of self-heated solid activated electrodes; a filling of inert gas or gases such as argon, neon, xenon, krypton, etc., at specifically determined pressures, i. e. argon in the range of eight millimeters, and a specifically determined amount of evaporizable metal such as mercury, cadmium, zinc, sodium, indium, gallium, rubidium, etc., alone or in mixtures thereof; one or more starting strips along the outside of the envelope being connected to one of the electrodes and extending in the close proximity of the other electrode to facilitate the forming of the initial arc discharge; and a means for controlling the heat dissipation in order to obtain a high vapor pressure of the vaporized metal or metals in the tube, by the use of some heat insulation means such as asbestos shielding or a thermos bottle type container, and thus a high light efficiency.

The inert gases are usually at about a pressure of 10 millimeters of mercury or the neighborhood. Besides the mercury, cadmium, zinc, etc., as mentioned above, these lamps may also contain small amounts of the alkaline metals such as sodium and rubidium for improving the color of the light output. Some of these metals, which have a tendency to attack the glass or the other parts of the tube, are placed in the tube in such small quantities and with materials for which they have such a marked chemical affinity; i. e. sodium in a sodium glass wool, or rubidium with some rubidium glass, etc.; such that they do not attack any of the parts of the tube but always condense on the material with which they were inserted. In order to insure that the various metals vaporize and thus add their spectral lines to those of the radiated light, these metals are added in specifically determined amounts which are so limited that the back voltage across the tube due to each of these metals is only a determined portion of the total voltage across the tube. Thus with a tube having mercury and cadmium and operating with a voltage of 80 volts across the tube due to the high pressure of the metal vapor in the neighborhood of one atmosphere, this voltage could be so divided that 40 volts is due to the mercury. Any other division of the voltage could also be obtained so that a great flexibility of the quality of the light output can be obtained.

It is not always practical to operate high pressure metal vapor lamps as described here from the ordinary line voltages using choke coils, resistances, incandescent lamps, etc., as ballast. For some sorts of illumination purposes it may be desirable to have a more point like source of radiation and at other times and for other reasons one may wish to have a lamp which is longer than the lamps made for operation on the regular 110 volt lines. For a lamp operating with a mercury vapor pressure of one atmosphere it is necessary to have a voltage drop in the arc of about one volt per millimeter; this means about an 88 mm. arc discharge for a tube to operate on 110 volts or a 160 mm. arc discharge for a tube operating on 220 volts. Thus for lamps which may be desired in a length of perhaps one meter, a voltage across the tube of 1,000 volts must be used. Such long tubes as this with a high voltage due to the high pressure of the metal vapor are especially advantageous as the power loss due to the fixed voltage of the cathode fall is only a very small percentage of the total power input to the tube. On the other hand short tubes which approach a point-like source must be operated with as little as 30 or 40 volts. Such a lamp as this would be especially useful for use with photography and more particularly for moving pictures, for taking the pictures, copying them and for projecting them. Naturally for these purposes a flickerless light would be particularly advantageous if not absolutely essential. The longer tubes are very good for use where a large area source is needed to give a shadowless light. In accordance with the invention herein set forth the above mentioned special lamps can be built and operated and are part of its various embodiments.

Another object of this invention is to eliminate the flicker in such devices by a shift of the phase of the current through one section of the tube with respect to the current through another part of the tube, or other parts of the tube, thus providing that there is a current flow through the device at all times, that is, a continuous energy input and therefore a continuous radiated output.

Still another object of this invention is the elimination of the flicker by the storage of the radiated energy in or on the envelope or the container of the device itself or in its surrounding equipment, or in the walls or the ceiling of the room in which the device is situated, by using a phosphorescent material as a constituent part of the envelope or as a coating thereon, or on the surface of the other above mentioned parts. This method also has the advantage of being able to supply any color deficiency which may be apparent in the primary source.

This undesirable flicker may also be prevented by using a flux leakage or high reactance transformer of such design that the rate of change of the voltage and the current at the time of their reversal is very high. This makes the duration of the period of darkness so short that it is imperceptible to the eye.

Other objects will be in part obvious or in part pointed out hereinafter.

The above and other various aspects of my invention are pointed out in the appended claims and will be better understood from the following description taken in connection with the accompanying drawings in which are shown one or more of the various possible embodiments of the features of my invention, in which, Figure 1 shows a tube and its accompanying circuit for obtaining flickerless radiation from a single phase alternating current source.

Figure 1a shows a similar arrangement for getting flickerless radiation from a three phase source.

Figure 2 shows another type of tube which may be used in place of the one shown in Figure 1. This tube has three special electrodes instead of one.

Figure 3 shows an arrangement whereby a simple two electrode tube using special electrodes may be used in connection with a separate rectifier to give flickerless light with single phase alternating current supply.

Figures 4a, 4b, 4c and 4d show several other combinations which may be used for single phase operation.

Figures 5a, 5b, 5c and 5d give some circuits and arrangements which may be used for two phase operation.

Figures 6a, 6b, 6c and 6d show similar arrangements for use with a three phase supply.

Figure 7 shows a simple two electrode tube using a dual vessel around the tube for heat insulation, the said vessel being coated with or having as a constituent part of its composition a phosphorescent material for flicker prevention.

Figure 8 shows the circuit for using a specially designed high reactance transformer for eliminating the flicker effect.

Referring in detail to Figure 1 of the drawings, there is shown diagrammatically a three electrode tube comprising a suitably formed container or vessel 1 of a suitable material, preferably of glass. The material of this envelope should be of an ultra-violet permeable substance if the tube is desired to be used as a source of ultra-violet radiation. The main electrode, the cathode 2, is mounted at one extremity of the tube and the other electrodes, the anodes 3, at the other in separate chambers 4. The lamp is filled with an inert gas such as argon, neon, xenon, krypton, etc., preferably argon, or any suitably proportioned mixture thereof, and preferably under a slight pressure of about 2 to 12 millimeters of mercury; and also contains a properly specified provision of some vaporizable metal such as mercury, cadmium, zinc, gallium, sodium, indium, etc., or any suitably proportioned mixture thereof. By properly proportioning the various parts of the lamp and properly heat insulating it, by some means such as asbestos shields or thermos bottle envelopes, and by placing therein a specifically determined amount of metal or metals, all this metal or metals can be vaporized at the operating temperatures of the lamp causing a high pressure of the metal vapor, one to two atmospheres, and a correspondingly high light efficiency. By this same action the back voltage is sometimes increased above the starting voltage; and also, due to the complete vaporization of the metallic content, great stability of operation is obtained. In order to facilitate starting of the lamp a thin conducting film may be used extending from one electrode 3 to the other, 2, or its vicinity. This film may be a strip covering only a portion of the surface of the tube, a mesh surrounding it or a film or a coating covering the entire envelope, or it might be the conductor to one of the electrodes running close to the other electrode, either inside or outside the tube.

The cathode 2 of this tube is of the glowing and emitting type and may be a special solid self-heating activated electrode with the activation material consisting chiefly of metallic barium in combination preferably with nickel or nickel alloys, for example with cobalt, as a core especially in the form of a porous structure made of wire, metal cups, or metal in some other similar form.

In this lamp the anodes 3 are made of some electro-negative material such as carbon, iron, tungsten, etc., which are of sufficient size to prevent overheating so that the rectifying action will take place.

The center tap of the transformer 9 is connected through the choke coil impedance 8 to the cathode 2 by the conductor 10 and the extremities of the secondary winding are connected through the leads 11 and 12 to the anodes 3. The choke coil must be used as a ballasting device to counteract the negative characteristic of the lamp. Instead of the choke coil 8 and the transformer 9, a transformer 9' with a high flux leakage and therefore a high reactance can be used. If such a high reactance transformer is used the necessity for any other ballasting device is eliminated. In this case it is desirable to have the characteristic curve of the transformer approximately match that of the tube. In either case the inductance of the choke or of the high reactance transformer acts as a means for the storage of energy which serves to smooth out the pulsating uni-directional current which was obtained from the alternating current by the rectifying action of the lamp. This gives a fairly smooth continuous current through the tube and thus a fluctuating but continuous radiated output with little noticeable flicker. Such an arrangement, slightly modified, might be used with such a tube as shown in Figure 6c or 6d for three phase operation.

In Figure 2 is shown another type of tube which may be used in place of that used in the circuit of Figure 1. In this tube the chambers 4 containing the anodes 3 are extended to the point 6 so that their length forms a considerable portion of the total length of the tube 1 and the length A—B is sufficient to prevent an arc-over from one anode 3 to the other. Instead of two separate tubes used as chambers 4, these chambers might be formed by extending a partition down through the center of the tube lengthwise to the point 6. When such a material as carbon is used for the anodes it is hard to get a good vacuum in the tube because it is very difficult to drive off all the gases from this material. Some other materials may be used which do not have this drawback. However in general they will not have the high resistance to disintegration which is characteristic of carbon, or its high surface work function, and therefore would have more tendency to arc-over unless the anode chambers were made longer to prevent this. Thus the tube shown in Figure 2 is designed for use with special electrodes, the anodes 5, having a high resistance to disintegration and of such a nature as to be readily de-gased, but having a surface work function less than that of carbon.

In Fig. 1a, I have shown a similar type tube having three arms in each of which is an anode connected to one branch of a star connected section 9 of a three phase transformer. The neutral point is connected through a choke 8 to the common cathode 2. A starting strip 7 is provided on one side as in Figs. 1 and 2.

Figure 3 shows another application of the rectifier principle to provide nearly flickerless light from a single phase supply by using a separate rectifier in combination with a gas or metal vapor discharge device comprising a suitably formed container or vessel 1' of a material permeable to the rays of the energy desired to be radiated, a filling as mentioned above, and glowing and emitting electrodes 2' mounted in the extremities of said container. These electrodes may be of the solid self-heating activated type described above. For starting the lamp a starting strip may also be used.

This circuit is a standard rectifier circuit in which the rectifier tube 14 may be any well known kind having a cathode 16 which might be of the solid self-heating activated type or any other type desired, and the two anodes 15 connected to the extremities of the secondary winding of the transformer 9. The cathode 16 is connected through the tube 1' described above and through a choke coil 8 by the lead 10 to the center tap of the secondary winding of the transformer 9. The primary of the transformer is connected to the supply line 13. By use of this arrangement the tube 1' is always supplied with a uni-directional current and thus gives an output with no flicker. The choke 8 serves a double purpose, that of smoothing the current and that of acting as a ballast device for the discharge tube. If an absolutely smooth non-flickering light is desired then another choke and several condensers can be added to form a filter section between the tube and the rectifier to remove all of the alternating current components in the input to the tube.

Figures 4a, 4b, 4c and 4d show schematically other embodiments of my invention for eliminating flicker in gas or metal vapor discharge tubes by the use of several adjacent tubes or one tube with a plurality of electrodes therein, and shifting the phase of the current through these adjacent parts. Thus in Figure 4a, two similar lamps 1', are best. These tubes may be of the type described above as lamp 1' for Figure 3. They have two glowing and emitting electrodes 2' placed at the extremities of the envelope 1'. These electrodes 2' may be of the special solid self-heating activated type described above. In this arrangement the electrodes act alternately as anodes and cathodes. The phase of the current through one of these tubes is shifted with respect to the current through the other by using the condenser 17 as a ballasting impedance. This impedance causes the current to lead the voltage impressed from the supply line 13 while the current through the other lamp is caused to lag the voltage because of the use of a choke coil 18 as a ballasting impedance. With this arrangement when the current through one of the lamps is close to zero and therefore the radiation from this lamp is almost negligible, the current through the other lamp is near maximum, the exact difference in phase depending on the constants of the circuit, and thus it is radiating when the other is not. Thus we have the equivalent of two separate lamps each operating on single phase alternating current with a fluctuating output, but with these fluctuations so timed that when one is near a maximum intensity the other is approximately at a minimum.

Naturally instead of using two separate tubes as shown in Figure 4a, a single tube 19' could be used, such as the one shown in Figure 4b comprising one large electrode in the center of the lamp and two similar but smaller electrodes mounted at the extremities of the tube which might be of any suitable shape.

Figure 4c shows an arrangement similar to that mentioned above but it uses three tubes 1', each with a current of different phase, to give a source of radiation with even less flicker than that described above. The current in one tube is caused to lag the impressed voltage by the use of the inductive reactance 18, the current in the second tube is nearly in phase with the voltage because of the non-inductive resistor 19 used as a ballast device, while the current through the third tube leads the applied voltage due to the condensers 17 used as an impedance for ballasting. In this case also, a tube with a plurality of electrodes could be used instead of three separate tubes. Thus a lamp such as shown in Figure 4b but with one more branch arm as shown in Figure 4d could be made to achieve the same result.

As this means of eliminating flicker is to have the current in adjacent lamps out of phase, it is evident that if a source of supply is available with multi-phase power then by placing a lamp in each phase this effect can be obtained. Figure 5a shows the connections that can be used for a two phase, four wire supply; and Figure 5b shows a similar connection for a two phase three wire supply. As mentioned above, a single tube with three electrodes could be used in the latter case as shown in Figure 5c. The two phases in these figures are brought in at the terminals 21 and 22.

It is understood that in all of these diagrammatic circuits the ballast device, which must be used with all of these lamps, has been omitted for the sake of simplicity. In cases where it is desirable an incandescent lamp may be used as a ballast device. This also permits the use of the radiation of such a lamp which at times is advantageous. When these tubes are used with transformers and chokes as ballast devices, it is possible to use a high reactance transformer in place of these two pieces of equipment.

Figures 6a, 6b, 6c and 6d show several circuits that may be used when a three phase supply is available. As stated above, several simple two electrode tubes 1' may be used as shown in Figures 6a and 6b, or a lamp with a plurality of electrodes may be used such as shown 24, 25 and 26 in Figures 6c and 6d. If a four wire three phase system is available, the neutral wire can be connected to the common connection in the center if separate tubes 1' are used, or a fourth electrode connected in the neutral wire may be inserted in the tube as indicated by the broken line 24n shown in Figure 6d at the point X.

Another feature of my invention is the use of phosphorescent materials to prevent flicker. These materials may be used as a coating on the surface of the envelope of any of the above mentioned tubes either on the inside or the outside, or as a constituent part of these envelopes, or as a coating on the reflectors used therewith, or to coat the ceiling or the walls of the rooms where these tubes are used as illuminants, or any suitable combination of these methods may be used. When a phosphorescent material is used it continues to emit light after the radiation which excited it has been removed. The length of time for which this emission will continue depends on the material used; it might be for micro-seconds or hours, or even longer. The earth alkali phosphides mixed with the heavy metals are very good phosphorescent materials. Numerous sulphides also fall in this category with those of strontium, barium, and calcium being the better of them. Many organic materials may also be used for they are highly phosphorescent especially the bone materials and organic phosphorescent substances. Irthoboric acid mixed with small quantities of aromatic organic compounds give very good results.

By using these materials the radiation from the tube is made continuous even though that from the excited gas in the tube is fluctuating. Probably the most important use for such a material is with a simple single phase lamp without a rectifier. However such a coating may be used with any of the above mentioned arrangements to give a perfect non-flickering source of radiation. At the same time if a conductive coating of a phosphorescent material is used, this coating may be made to serve the double purpose of being a flicker preventative and also a starting strip.

As phosphorescent materials emit radiations of wave-lengths different from those that excite, such materials may also be used to fill in any deficiencies in color which the primary source of radiation may be deficient in or lack completely. At the same time it is also preferable to have these phosphorescent materials properly selected so that the ultra-violet radiation lines are transformed into visible spectrum lines which are within the same spectral range as those already present.

The use of a phosphorescent material as outlined above may be applied to any discharge device for the elimination of flicker or fluctuations in the radiated output of said device. Figure 7, for example, shows a lamp 27 with an outside envelope which is evacuated to act as a heat insulating shield for the tube itself. This outer envelope might be coated either inside or out with a phosphorescent material or might have such a substance incorporated as a constituent of the glass itself. In case of a lamp using a Dewar flask a similar arrangement might be used.

Sometimes it is possible to eliminate the flicker by making the period when the current is zero of such a short duration that the period of darkness is imperceptible to the eye. This can be done either by the application of high voltages, that is higher than the voltages usually applied, or by the use of a properly designed flux leakage transformer. In either case the rate of change of the voltage about the zero point is so rapid that the time that elapses, from the point where the decreasing voltage across the tube is too low to sustain the arc to the point where the increasing voltage is of sufficient value to start the arc again, is only a very small portion of the cycle. If these conditions are properly brought about, a two electrode tube can be made flickerless, even though the current does reverse twice a cycle. Figure 8 shows the connections in such a case in which 1' is the discharge tube and 9' is the high reactance transformer.

As various possible embodiments may be made in the above invention and as many various changes might be made in the embodiment above set forth, it is understood that all matter contained in the accompanying specifications shall be interpreted as illustrative and not in a limiting sense.

What I claim as my invention, and desire to secure by Letters Patent of the United States, is:

1. An electrode for a gaseous discharge device which comprises a nickel-cobalt alloy and activation material consisting chiefly of alkaline earth metal.

2. A lamp unit comprising in combination a gaseous electric discharge lamp comprising a container, electrodes sealed therein, a gaseous atmosphere therein and a phosphorescent material associated with said container, two of said electrodes being cold electrodes, another of said electrodes being a thermionic electrode, said cold electrodes being mounted on opposite sides of and at equal distances from said thermionic electrode, the rays emitted by said gaseous atmosphere, when excited by the passage of a discharge between said electrodes, causing said phosphorescent material to emit light and an alternating current source for said lamp, said current source being a transformer, said thermionic electrode being connected to the mid-point of said transformer and said cold electrodes being connected to opposite ends of said transformer.

HANS J. SPANNER.